(12) United States Patent
Kuttenberger et al.

(10) Patent No.: US 9,511,731 B2
(45) Date of Patent: Dec. 6, 2016

(54) METHOD AND CONTROL DEVICE FOR TRIGGERING PASSENGER PROTECTION MEANS FOR A VEHICLE

(75) Inventors: Alfred Kuttenberger, Herrenberg (DE); Marc Theisen, Besigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 895 days.

(21) Appl. No.: 12/736,757

(22) PCT Filed: Mar. 27, 2009

(86) PCT No.: PCT/EP2009/053675
§ 371 (c)(1),
(2), (4) Date: Jan. 26, 2011

(87) PCT Pub. No.: WO2009/138293
PCT Pub. Date: Nov. 19, 2009

(65) Prior Publication Data
US 2011/0112725 A1   May 12, 2011

(30) Foreign Application Priority Data
May 15, 2008  (DE) .................. 10 2008 001 781

(51) Int. Cl.
*B60R 21/0134* (2006.01)
*B60R 21/013* (2006.01)
*B60R 21/01* (2006.01)

(52) U.S. Cl.
CPC ......... *B60R 21/0134* (2013.01); *B60R 21/013* (2013.01); *B60R 2021/01013* (2013.01); *B60R 2021/01302* (2013.01)

(58) Field of Classification Search
USPC ..... 701/1, 36, 45, 46, 47, 48; 340/436, 435; 280/734, 735; 180/282, 271
See application file for complete search history.

(56) References Cited

U.S. PATENT DOCUMENTS

| | | | |
|---|---|---|---|
| 5,835,007 A * | 11/1998 | Kosiak | 340/436 |
| 6,012,008 A * | 1/2000 | Scully | 701/45 |
| 6,271,747 B1 * | 8/2001 | Fendt et al. | 340/436 |
| 6,295,495 B1 * | 9/2001 | Morman et al. | 701/45 |
| 6,498,972 B1 * | 12/2002 | Rao et al. | 701/45 |
| 6,678,599 B2 | 1/2004 | Eisele et al. | |

FOREIGN PATENT DOCUMENTS

| | | |
|---|---|---|
| DE | 198 45 568 A1 | 10/1999 |
| DE | 100 65 518 | 7/2002 |
| DE | 101 40 119 | 3/2003 |
| DE | 102 12 963 A1 | 10/2003 |
| DE | 103 24 217 | 12/2004 |
| DE | 10 2004 027 693 A1 | 10/2005 |

(Continued)

*Primary Examiner* — Dale Hilgendorf
(74) *Attorney, Agent, or Firm* — Norton Rose Fulbright US LLP; Gerard Messina (57) ABSTRACT

A control device and a method for triggering passenger protection means for a vehicle are provided, the passenger protection means being triggered as a function of at least one signal from an impact sensor system and at least one precrash signal. The at least one precrash signal is evaluated as a function of a classification of at least one functionality, the functionality being influenced as a function of the least one precrash signal.

24 Claims, 4 Drawing Sheets

(56) References Cited

FOREIGN PATENT DOCUMENTS

| | | |
|---|---|---|
| DE | 10 2005 003 354 | 8/2006 |
| DE | 10 2005 005 959 A1 | 8/2006 |
| DE | 10 2005 033 937 | 1/2007 |
| DE | 10 2007 015 768 | 10/2007 |
| DE | 10 2006 038 837 | 2/2008 |
| WO | 2005/082681 A1 | 9/2005 |

* cited by examiner

METHOD AND CONTROL DEVICE FOR TRIGGERING PASSENGER PROTECTION MEANS FOR A VEHICLE

BACKGROUND OF THE INVENTION

1. Field of the Invention

The present invention relates to a method and a control device for triggering passenger protection means for a vehicle.

2. Description of Related Art

Published German patent application document DE 103 24 217 A1 already describes performing a precise triggering of restraining devices as a function of signals of a precrash sensor system.

SUMMARY OF THE INVENTION

In contrast, the method according to the present invention and the control device according to the present invention for triggering passenger protection means for a vehicle having the features of the independent claims have the advantage that an improved use of the precrash signals and thus an improved merging of information from the precrash sensor system and the acceleration sensor system is possible. This is achieved by evaluating the precrash signal as a function of a classification of at least one functionality. The functionality is influenced as a function of at least one precrash signal. Thus, it is possible to exclude precrash signals that do not relate to the current accident object from factors influencing the triggering algorithm for the passenger protection means. At the least, however, the signals of the precrash sensor system may be evaluated in order to attenuate or amplify them in accordance with the evaluation. This is achieved by at least one functionality that itself is influenced as a function of the at least one precrash signal. As follows from the dependent claims, this influencing may occur via the time to impact derived from the precrash signals, for example. The functionality is accordingly influenced in its response as a function of the precrash signal. Thus, the influence on a triggering algorithm is determined via the subsequent evaluation of the precrash signal via the functionality.

In the case at hand, the triggering of passenger protection means is the activation of such passenger protection means as an airbag, a belt tightener, a crash-active headrest, or movable seat elements, etc.

The triggering is carried out as a function of at least one signal of an impact sensor system and as a function of at least one precrash signal. That is, these two signals influence the type of passenger protection means to be triggered and whether the passenger protection means are triggered.

The signal of an impact sensor system may be any possible signal, even derived signals as interim results from the original measuring signal. Such preprocessing includes filterings, averaging, integrations, summing, or other formations of characteristics.

The impact sensor system may be an acceleration sensor system, an air-pressure sensor system, a deformation sensor system, or a structure-borne noise sensor system, for example. Combinations of the above are also possible.

The precrash signal may be any possible signal from a precrash sensor system or derived from such signals. An example of such a precrash signal is the time to impact from the current location of the object to the driver's vehicle, that is, the ego vehicle. Thus, it is the impact time, which is referred to as time to impact (TTI). An alternative to this is the distance between the object and the ego vehicle.

Any possible environmental sensor systems may be considered as precrash sensor systems. This includes radar, ultrasound, video, or a capacitive environmental sensor system, for example. The precrash signal may also have undergone all possible types of preprocessing, such as a filtering, averaging, integration, etc.

The functionality may also be any possible functionality, for example, in accordance with the dependent claims, a counter that may be modified in a linear or non-linear manner. The classification of the at least one functionality means which value the functionality has at a given time, for example. The classification corresponding to a value range is performed in accordance with the value's inclusion in this value range.

The term evaluation may mean a gradual restriction of the influence of the precrash signal on the main algorithm, for example, or also disconnecting or connecting the precrash signal for further processing, whether the triggering of the passenger protection means is to take place or not.

The influencing of the functionality as a function of the at least one precrash signal means that the functionality is modified as a function of the precrash signal. That is, the functionality is modified more or less depending on the current precrash signal. In other words, the extent of the modification is determined by the precrash signal. Thus, a functional dependency exists.

In the case at hand, a control device is an electric device that processes sensor signals and outputs control signals for the passenger protection means as a function thereof.

The interfaces are predominantly designed as hardware and/or software. In a hardware design, the interfaces may, for example, be part of a so-called system ASIC that contains the most different functions of the airbag control device. However, it is also possible for the interfaces to be separate, integrated circuits or to be at least partially made up of discrete components. In a software design, the interfaces are software modules on a microcontroller, in addition to other software modules, for example, and are available to provide the precrash signal and the impact signal.

The evaluation circuit may be a processor, for example, in particular a multicore processor. Any possible processor type, a microcontroller, for example, may be considered for this purpose. The evaluation circuit may also be an ASIC, however, in which the functions of the evaluation circuit are not implemented in software, but rather in hardware. A combination of hardware and software implementations is also possible in the case at hand. That is, the evaluation circuit may include a system made up of a processor and a hardware circuit, for example.

The triggering algorithm may be any possible triggering algorithm that is able to process the precrash signal and the impact signal in such a manner that a triggering signal may be generated as a function of these sensor signals if the passenger protection means are to be triggered as a result of the accident severity. For this purpose, the triggering algorithm may use threshold comparisons and in particular classifications, for example. In particular, the triggering algorithm may include a plurality of independent processes that occur simultaneously.

The triggering signal may assume all possible forms of a signal. In particular, the triggering signal may contain information about whether the passenger protection means are to be triggered, when the passenger protection means are to be triggered, which passenger protection means are to be triggered, and how these passenger protection means are to be triggered. Advantageously, the triggering signal may be transmitted via an SPI (serial peripheral interface) bus.

In particular, the triggering circuit may also be an integrated circuit, which may likewise be part of the so-called system ASIC, for example. Additionally, a discrete or separate integrated solution is also possible.

The evaluation module for evaluating the at least one precrash signal as a function of a classification of at least one functionality and the influence module for influencing the functionality as a function of the at least one precrash signal may be designed as hardware and/or software, in accordance with the evaluation circuit. In the case at hand, the influence module is an element of the evaluation module, that is, in a software design, the influence module exists as a submodule in comparison to the evaluation module. In a hardware design, the influence module forms a part of the circuit that includes the evaluation module.

The measures and further developments set forth in the dependent claims make possible advantageous improvements to the method or control device recited in the independent claims.

It is advantageous that the functionality has at least one counter that is influenced by the fact that the at least one counter is initialized as a function of the at least one precrash signal. The functionality may thus have one or a plurality of counters, the precrash signal causing an initialization, i.e., a start, of the counter, depending on its development. In this context, initialization may mean that the counter is set to zero or that the counter receives a particular value that the counter then increments or decrements. Above all, this means that an incoming current precrash signal is used for initializing, i.e., a new precrash signal causes an update of the counter reading. Thus, the method according to the present invention becomes more accurate.

It is furthermore advantageous that the at least one counter is decremented in predefined intervals until a threshold is reached; when the threshold is reached, the at least one precrash signal is provided at this time for the triggering. That is, if the counter reaches the threshold through the decrementation, the precrash signal that exists at this time is provided for the triggering, i.e., as an input parameter in the triggering algorithm. In this instance, for the predefined intervals means in one cycle of the control device. However, another predefined interval may also be predefined.

The control device cycle is the time cycle in which the control device processes specific tasks. The real time cycle of 500 µs is provided for the reduction of the TTI counter. Longer cycles from the background are also conceivable, but the method according to the present invention is more accurate using the real time cycle.

The counter may also be designed as hardware and/or software. This is determined according to the design of the evaluation circuit.

Furthermore, it is advantageous that an impact time is determined as a function of the at least one signal, and the predefined precrash signal is evaluated as a function of the impact time. That is, if the impact signal exists, then contact did actually occur and the impact time may be determined with the aid of the impact signal. For example, this may occur in that in the case of an acceleration signal as the impact signal, a so-called noise threshold of 3 to 6 g is set, the exceeding of which indicates the beginning of the crash. Another way to determine the contact time even more accurately is to use the existing acceleration signal to calculate or determine the zero point of the acceleration signal, by using an approximated function, for example. The zero point determined in this manner then corresponds with the impact time (contact time).

It is then possible to use the impact time to evaluate the precrash signal, in particular if the precrash signal itself indicates the impact time according to the analysis of the precrash signal. If the comparison of these two impact times results in a great discrepancy, then the precrash signal is not used anymore. However, if the impact time that was obtained using the precrash signal falls within a certain range around the impact time that was ascertained from the impact signal, then the precrash signal may possibly be used longer, possibly with slight modifications. The impact time is the time at which the ego vehicle contacts the impact object.

In order to compare the impact time that was ascertained using the precrash signal with the impact time that was ascertained using the impact signal, an acceptance window for the impact time that was ascertained from the precrash signal may be set around the second impact time. Then, as a function of this acceptance window, the precrash signal is evaluated, i.e., does the impact time according to the precrash signal fall within the acceptance window or not. With regard to its dimensions, the acceptance window may be implemented adaptively as a function of parameters such as the velocity of the host vehicle.

It is furthermore advantageous that a blind region of a precrash sensor system for generating the precrash signal at least includes the acceptance window. The blind region is that region that is very close to the vehicle and in which the precrash sensor system can no longer record an object due to its design. The acceptance window may be the same as this blind region.

It is furthermore advantageous that in the blind region at least one object is tracked further using the at least one counter, and a new precrash signal is accepted only if the new precrash signal is plausible in the light of the at least one counter reading. This means that although the precrash sensor system can no longer track the object in the blind region, the tracking continues at least arithmetically with the aid of the counter reading. Then, if a new precrash signal is obtained again, this precrash signal is compared with the counter reading or counter characteristic such that this new precrash signal is accepted only if the new precrash signal is plausible in the light of the at least one counter reading. Thus, in this instance as well, a certain conformity must exist, i.e., the object that was tracked using the counter reading now once again provides a precrash signal, and this precrash signal may then be used to update the counter reading. This may also occur with a corresponding window.

It is furthermore advantageous that the blind region is used if the at least one object is no longer recordable or if the at least one object is lost.

Furthermore, it is advantageous that the at least one precrash signal has an impact time. This impact time is then—as specified above—compared to the impact time that was ascertained from the impact signal.

Exemplary embodiments of the present invention are illustrated in the drawing and are explained in greater detail in the following description.

BRIEF DESCRIPTION OF THE DRAWINGS

FIG. 7 shows an additional schematic representation.

DETAILED DESCRIPTION OF THE INVENTION

Figure 1:
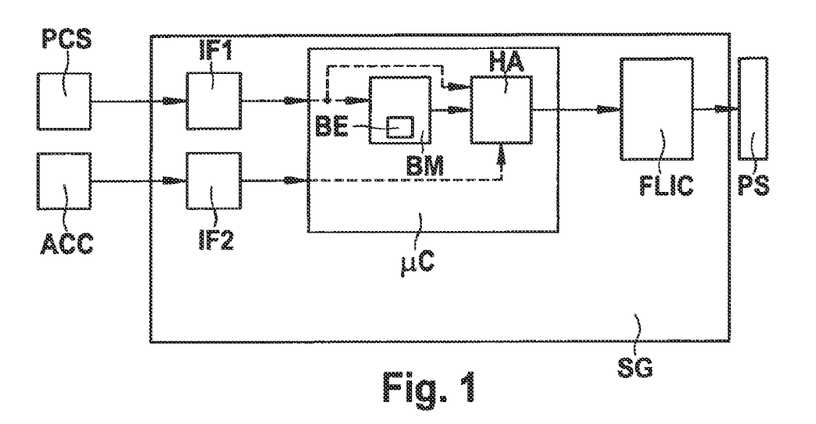
FIG. 1 shows a block diagram of the control device according to the present invention having connected components.

FIG. 1 illustrates in a block diagram control device SG according to the present invention having the following connected components: a precrash sensor system PCS, an acceleration sensor system ACC, and passenger protection means PS. In the case at hand, only the components necessary to gain an understanding of the present invention are described.

Additional components necessary for the operation of control device SG are omitted for the sake of simplicity.

Precrash sensor system PCS is a radar and/or ultrasound and/or video and/or capacitive environment sensor system, for example. Precrash sensor system PCS transmits its preprocessed or raw signals digitally, for example, to an interface IF1 in control device SG. Interface IF1 provides at least one reformatting of the received precrash signals into a format provided for control device SG. In this format, the precrash signals are transmitted to a microcontroller pc from the evaluation circuit, via the SPI (serial peripheral interface) bus, for example. Different software modules are provided in microcontroller pc. On the one hand, evaluation module BM having an influencing module BE provides preprocessing, and a main algorithm HA is provided, which generates the triggering signal as a function of the precrash signal and the acceleration signal. For this purpose, these signals are transmitted to the main algorithm—as indicated in dashes.

Preprocessing may be provided, which conditions the precrash signal or the acceleration signal accordingly for main algorithm HA. However, the precrash signal still goes into an evaluation module BM for preprocessing. Evaluation module BM is provided to prevent the transfer of precrash signals to the main algorithm, or their further processing, when they do not have anything to do with the current impact object. Precrash signals that are implausible are also to be eliminated by this means. For this purpose, the evaluation module has an influencing module BE that influences a functionality as a function of the precrash signal. In this case, the functionality is a counter that is decremented as a function of the precrash signal. The counter is initialized when the precrash signal first appears. With each new precrash signal, the counter reading may be modified, the counter being decremented as a function of the cycle of the control device. Thus, if the object intrudes into a blind region of the vehicle, for example, it is possible to continue tracking the object with the aid of the counter. The precrash signal is normally used for deriving the time up to the impact, the so-called time to impact (TTI). If the counter reaches a predefined threshold, then the precrash signal that exists at this time is used for the processing in main algorithm HA.

Main algorithm HA then ensures, as a function of the signal of evaluation module BM, that the precrash signal is used or that it is not used. As a function of this decision and the acceleration signal, main algorithm HA then performs its algorithm and possibly generates a triggering signal for triggering circuit FLIC, which is located outside of microcontroller μC. This triggering signal is supplied to triggering circuit FLIC, via the SPI bus as well, for example. Triggering circuit FLIC then brings about the triggering of passenger protection means PS, in that the ignition elements of pyrotechnical passenger protection means are supplied with current and are thus triggered, for example. Reversible passenger protection means such as crash active head rests, electromotive belt tighteners, etc., may also be triggered by this means, in that they are also accordingly supplied with current.

In addition to acceleration sensor system ACC, every other impact sensor system may also be used additionally or alternatively.

Figure 2:
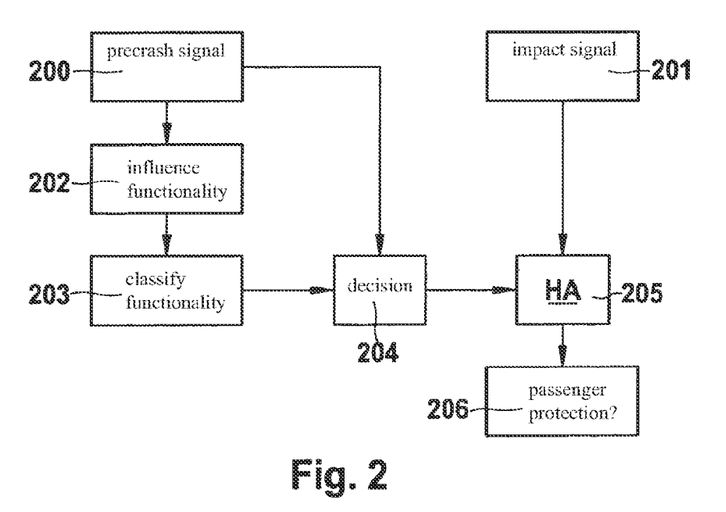
FIG. 2 shows a first flow chart of the method according to the present invention.

FIG. 2 shows the sequence of the method according to the present invention in a flowchart. In method step 200, the precrash signal is provided, by interface IF1, for example. In method step 201, the impact signal is provided by interface IF2. In method step 202, the precrash signal causes the functionality in use, for example, the counter, to be influenced in accordance with this precrash signal, in that the counter reading is set in accordance with the precrash signal, for example. In method step 203, this functionality is then classified, as illustrated above, for example, if a threshold value is reached through the regular decrementing. In method step 204, the classification is then used to make a decision regarding whether the precrash signal is to be transferred to main algorithm 205. The impact signal also goes into main algorithm 205. Then, main algorithm 205 decides whether passenger protection means PS will be triggered in method step 206.

Figure 3:
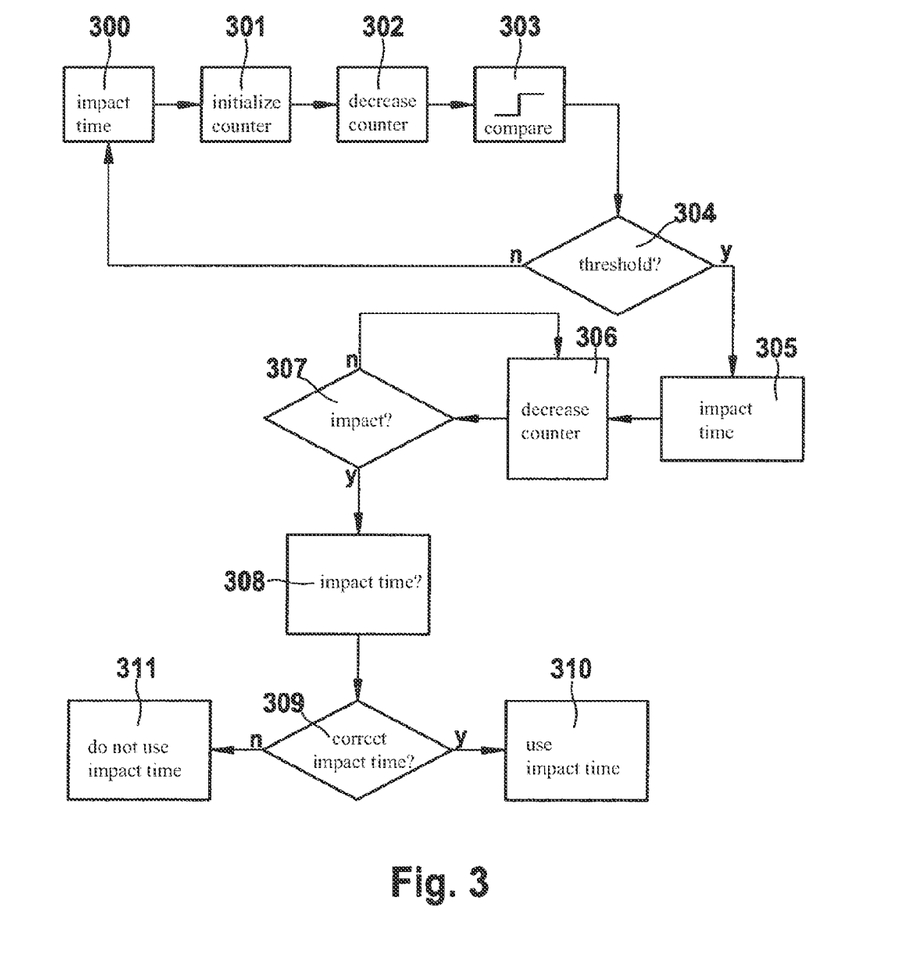
FIG. 3 shows a second flow chart of the method according to the present invention.

FIG. 3 shows an additional flow chart of the method according to the present invention. In method step 300, the time to impact, that is, the impact time, is provided as a precrash signal. This is then used to initialize a counter in method step 301. In method step 302, this counter is decremented per cycle of the control device. The threshold value comparison is then performed in method step 303. In method step 304, the outcome of the threshold value comparison is checked. If the threshold has not yet been reached, then a return is made to method step 300, and the current impact time from the current precrash signal is used. Then, method step 301 follows.

However, if it was determined in method step 304 that the threshold was reached, then the impact time, that is, the precrash signal, is used for the further processing in method step 305. In method step 306, the counter is further decremented, in order to continue tracking the object via this counter reading. In method step 307, a check is carried out to see whether an impact was determined with the aid of the signal of the impact sensor system. If this is not the case, then method step 306 is repeated.

However, if it was determined in method step 307 that an impact occurred, then a check is performed in method step 308 to see whether the impact time ascertained with the aid of the impact signal is still permissible, allowing for specific deviations, with the impact time from the precrash signal. The result from method step 308 is checked in method step 309. If the impact time is correct, then the precrash signal is used longer with the impact time in method step 310 in the algorithm, in order to influence a characteristic, for example. If this is not the case, then in method step 311 it is decided not to use the precrash signal in main algorithm HA.

Figure 4:
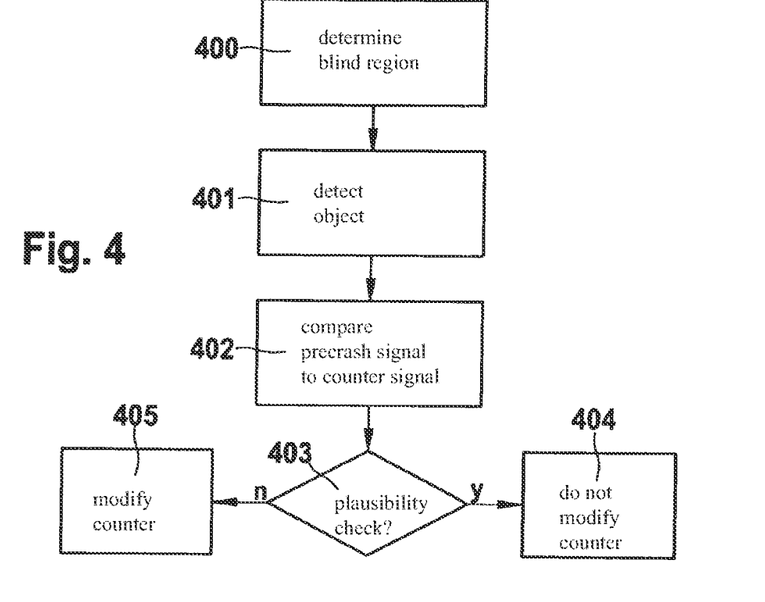
FIG. 4 shows a third flow chart of the method according to the present invention.

An additional flowchart of the method according to the present invention is shown in FIG. 4. In method step 400, the blind region for the currently tracked object is determined. In method step 401, the object is detected again via the precrash sensor system, the precrash signal being plausibilized with the aid of the counter signal in method step 402. In method step 403, a check is then carried out to determine the outcome of this comparison. That is, whether the counter reading and the regenerated precrash signal are plausible. If the precrash signal is plausible, then this precrash signal is taken as the current precrash signal in method step 404, and the counter is accordingly modified. If this is not the case, then in method step 405 a decision is made to leave the counter reading as it is and to ignore this new precrash signal.

Figure 5:
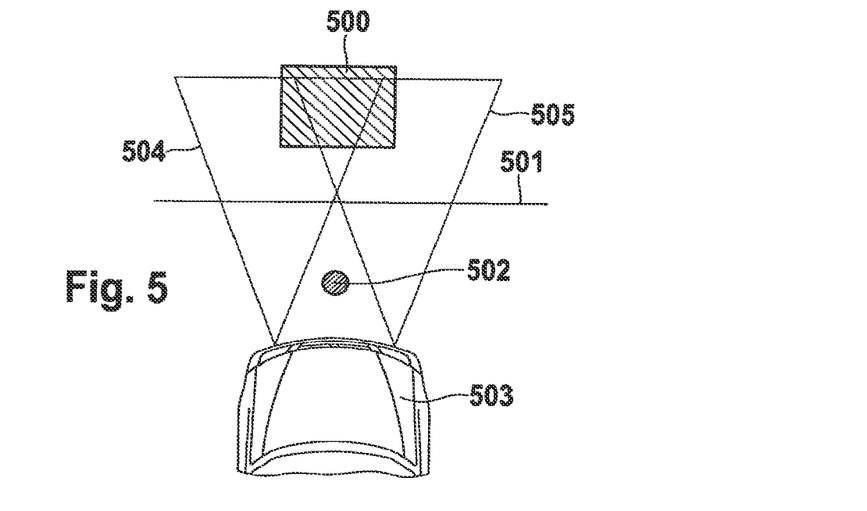
FIG. 5 a schematic representation of the recording region of the precrash sensor system.

FIG. 5 shows in a schematic illustration a blind region 501 for the precrash sensor system, which is illustrated with its recording regions by the triangles 504 and 505. In the case at hand, tracked object 502 is in the blind region and a new object 500 is in recording region 504 or 505. If an object undershoots distance 501, that is, the blind region, then the precrash signal for reaching this distance is frozen for the further consideration and the counter is further decremented. Thus, a new signal, which is generated by object 500, may be classified as implausible for object 502. New object 500 is then accordingly not tracked further. In the case at hand, illustrated schematically, vehicle 503 has only two sensors that generate recording regions 504 and 505.

Figure 6:
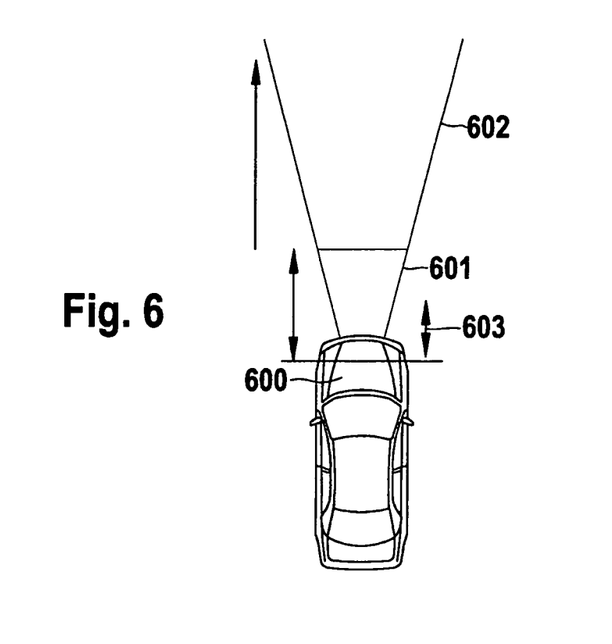
FIG. 6 an additional schematic representation.

In the schematic illustration according to FIG. 6, the so-called "normal window 602" is indicated for a vehicle 600, which means that if an object is lost, it is no longer further tracked by the precrash algorithm. However, a new object is tracked by the precrash algorithm. In the smaller, so-called "lock window," 601 the following occurs: If an object is lost in this instance, the precrash algorithm nevertheless continues the tracking, and if a new object is seen, then only the old object is tracked by the precrash algorithm. In the case at hand, another asymmetry is provided.

The asymmetry is to allow for a degree of freedom in the parameter setting. Thus, the acceptance region "after" T0 may be set independently of the lock window and the acceptance region before T0.

However, in the so-called "acceptance window 603," a new precrash signal is accepted, if the counter reading and the impact time are within the acceptance window.

Figure 7:
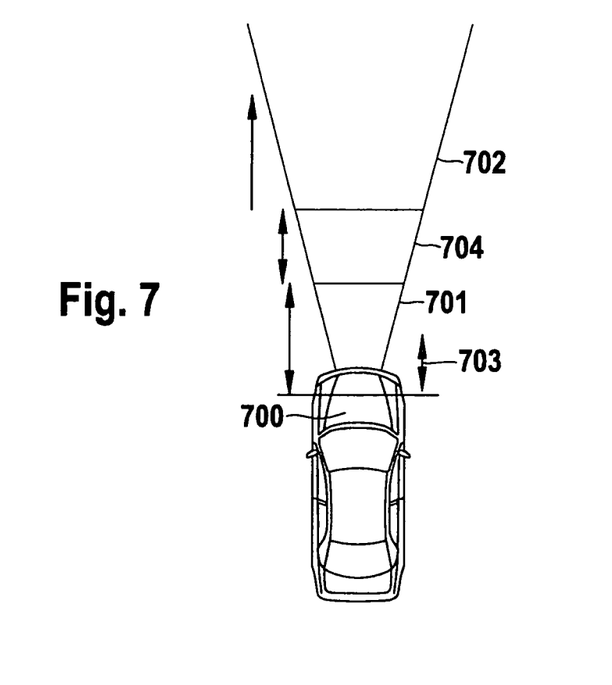

FIG. 7 shows an additional schematic illustration with an additional variant. Once again, a normal window 702 is provided for a vehicle 700 along with the so-called lock window 701 and acceptance window 703. The so-called "catch window" 704 is also provided between the lock window and normal window 702. In catch window 704 a situation is brought about in which the precrash counter is not reset in the catch window, but rather continues counting, even if an object is lost. In contrast to the so-called normal window, however, the counter is set to the new values when these values belong to a precrash object, e.g., the time to impact or the impact speed, and are not equal to the so-called "default values".

The default values are the values that the precrash sensor transmits when no object was ascertained, e.g., CV=0 km/h and TTI the maximum value of the transmission region, e.g., 2.5 s.

What is claimed is:

1. A control device for triggering a passenger protection device for a vehicle, comprising:
   a first interface that provides at least one precrash signal;
   a second interface that provides at least one impact signal;
   an evaluation circuit that has a triggering algorithm for generating a triggering signal as a function of the at least one precrash signal and the at least one impact signal; and
   a triggering circuit for triggering the passenger protection device as a function of a triggering signal;
   wherein the evaluation circuit has an evaluation module for evaluating the at least one precrash signal as a function of a classification of at least one functionality, the evaluation module having an influencing module for influencing the functionality as a function of the at least one precrash signal.

2. A method for triggering passenger protection device for a vehicle, the method comprising:
   triggering the passenger protection device as a function of at least one signal of an impact sensor system and at least one precrash signal, wherein the at least one precrash signal is evaluated as a function of a classification of at least one functionality, the functionality being influenced by the at least one precrash signal.

3. The method as recited in claim 2, wherein the functionality is at least one counter that is influenced by the fact that the at least one counter is initialized as a function of the at least one precrash signal.

4. The method as recited in claim 3, wherein the at least one precrash signal has an impact time.

5. The method as recited in claim 3, wherein the at least one counter is decremented in predefined intervals until a threshold is reached, and when the threshold is reached, the at least one precrash signal is provided at this time for the triggering.

6. The method as recited in claim 5, wherein the at least one precrash signal has an impact time.

7. The method as recited in claim 5, wherein an impact time is determined as a function of the at least one signal, and the predefined precrash signal is evaluated as a function of the impact time.

8. The method as recited in claim 7, wherein the at least one precrash signal has an impact time.

9. The method as recited in claim 7, wherein an acceptance window for the at least one precrash signal is set around the impact time and the at least one precrash signal is evaluated as a function of the acceptance window.

10. The method as recited in claim 9, wherein the at least one precrash signal has an impact time.

11. The method as recited in claim 9, wherein a blind region of a precrash sensor system for generating the precrash signal includes at least the acceptance window.

12. The method as recited in claim 11, wherein the at least one precrash signal has an impact time.

13. The method as recited in claim 11, wherein in the blind region at least one object is further tracked using the at least one counter, and a new precrash signal is accepted only if the new precrash signal is plausible in view of the at least one counter.

14. The method as recited in claim 13, wherein the at least one precrash signal has an impact time.

15. The method as recited in claim 13, wherein the blind region is used if the at least one object is no longer recordable or if the at least one object is lost.

16. The method as recited in claim 15, wherein the at least one precrash signal has an impact time.

17. The method as recited in claim 2, wherein the at least one precrash signal has an impact time.

18. The method as recited in claim 2, wherein the at least one counter is decremented in predefined intervals until a threshold is reached, and when the threshold is reached, the at least one precrash signal is provided at this time for the triggering.

19. The method as recited in claim 2, wherein an impact time is determined as a function of the at least one signal, and the predefined precrash signal is evaluated as a function of the impact time.

20. The method as recited in claim 2, wherein an acceptance window for the at least one precrash signal is set around the impact time and the at least one precrash signal is evaluated as a function of the acceptance window.

21. The method as recited in claim 2, wherein a blind region of a precrash sensor system for generating the precrash signal includes at least the acceptance window.

22. The method as recited in claim 21, wherein in the blind region at least one object is further tracked using the at least one counter, and a new precrash signal is accepted only if the new precrash signal is plausible in view of the at least one counter.

23. The method as recited in claim 22, wherein the blind region is used if the at least one object is no longer recordable or if the at least one object is lost.

24. The method as recited in claim 23, wherein the at least one precrash signal has an impact time.

\* \* \* \* \*